April 4, 1939. W. H. TRINKLER 2,153,530
DEVICE FOR JACKING UP OF MOTOR VEHICLES OR
OTHER POWER PROPELLED CONTRIVANCES
Filed May 20, 1935 2 Sheets-Sheet 1

Inventor
Walter H. Trinkler
John F. Brezina
Atty.

April 4, 1939.　　　W. H. TRINKLER　　　2,153,530
DEVICE FOR JACKING UP OF MOTOR VEHICLES OR
OTHER POWER PROPELLED CONTRIVANCES
Filed May 20, 1935　　　2 Sheets-Sheet 2
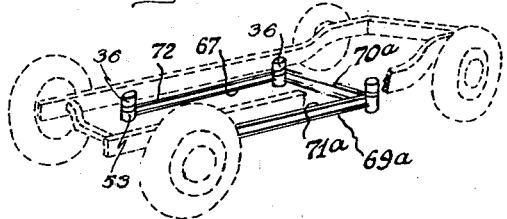
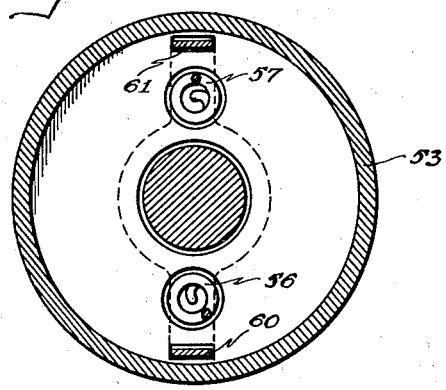
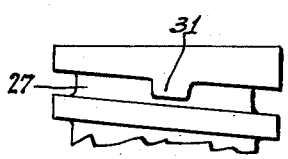
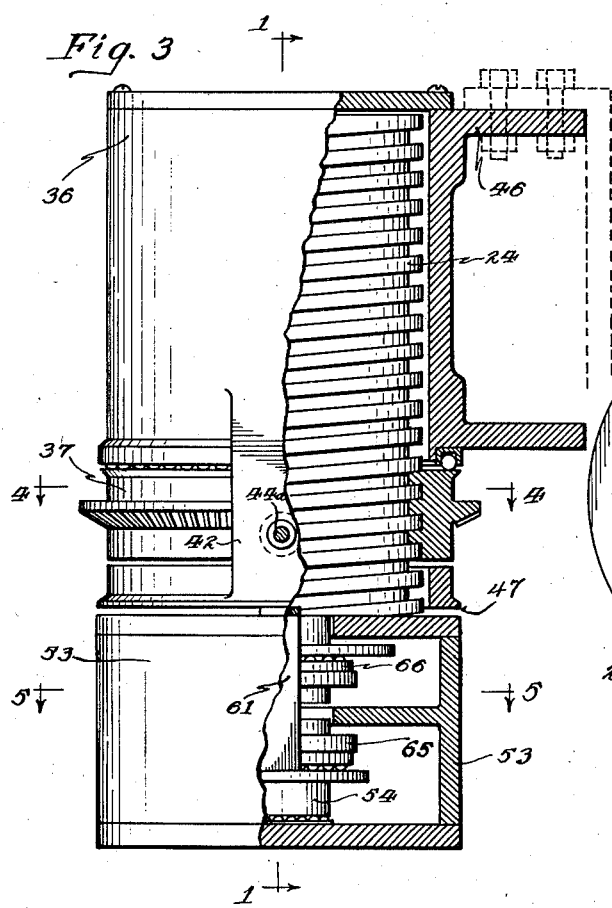
Inventor
Walter H. Trinkler
John J. Brezina
Atty.

Patented Apr. 4, 1939

2,153,530

UNITED STATES PATENT OFFICE 2,153,530

DEVICE FOR JACKING UP OF MOTOR VEHICLES OR OTHER POWER PROPELLED CONTRIVANCES

Walter Horatio Trinkler, Chicago, Ill.

Application May 20, 1935, Serial No. 22,371

7 Claims. (Cl. 254—86)

I have invented a "Power vehicle jack" for motor vehicles or other power contrivances propelled by means of motor power of said vehicles, the device being permanently secured to the vehicle and operated from the driver's seat or otherwise.

My invention consists of a mechanism embodying features of improvement set forth and fully explained in the following detailed description and illustrated by the drawings.

In the drawings, Figure 1 represents a cross section of the power vehicle jack of my invention.

Fig. 2 is a perspective view showing in dotted lines a vehicle chassis and showing generally the relative position wherein is mounted the power vehicle jack of my invention and showing power transfer shaft connecting same.

Fig. 3 is a side elevational view partially in section and with certain parts broken away to show the interior of the vehicle jack.

Fig. 4 is a cross sectional view taken on line 4—4 of Fig. 3.

Fig. 5 is a cross sectional view taken on line 5—5 of Fig. 3.

Fig. 6 is a fragmentary view in side elevation showing a fragment of the upper end of the jack screw.

Figure 1:
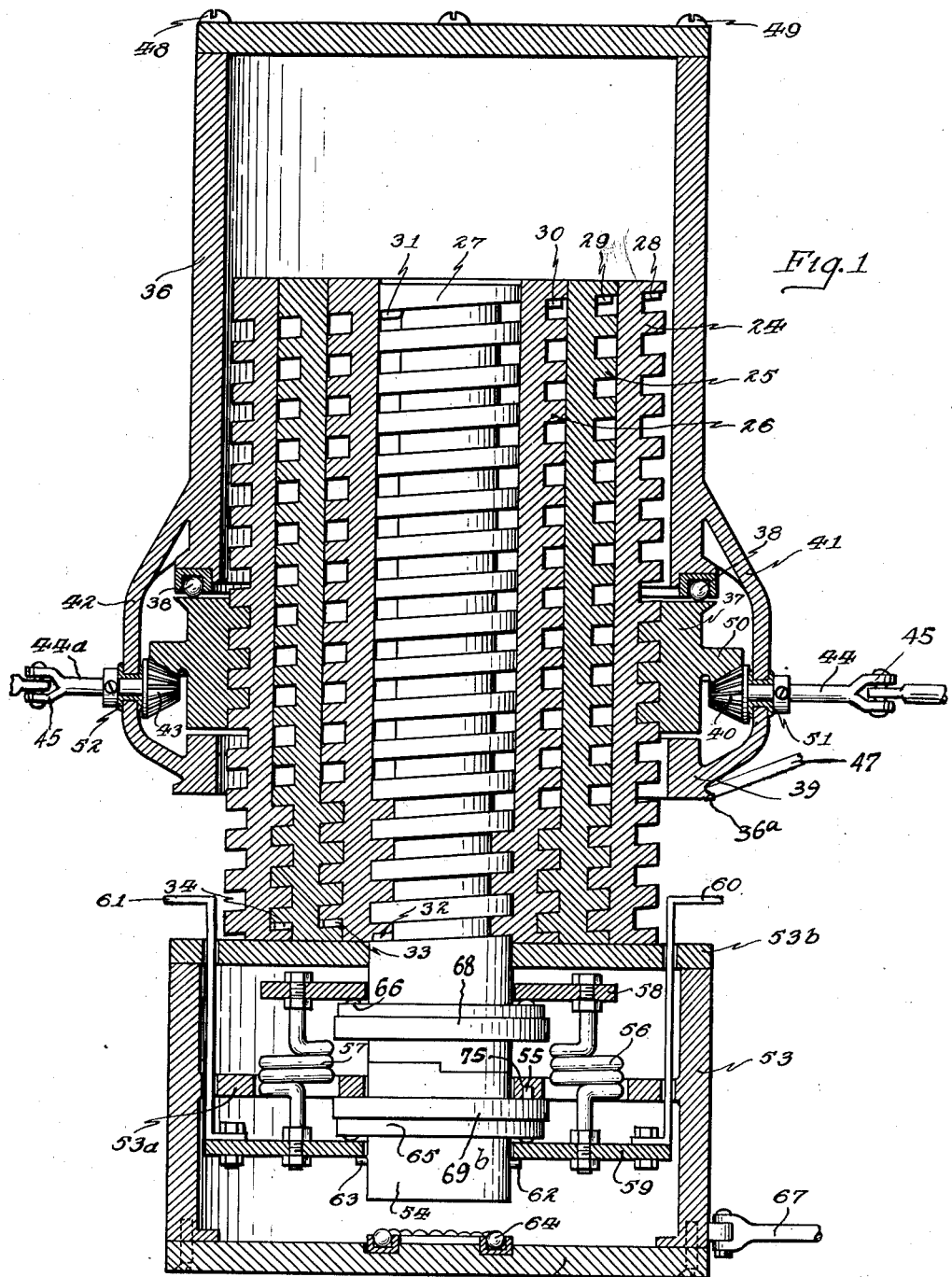

Referring to Figure 1, 24, 25, 26 and 27 are four screws with integral stud obstructions or stops for limiting the outward and inward movements said stud being indicated by 28, 29, 30, 31, 32, 33, 34 and respectively 35. All the four screws are either right or left hand screws. Screws 24, 25, and 26 which are concentric and cylindrical are also threaded internally, but at their lower ends only. The internal as well as the external threading and inclination of all four screws is in the same direction. This compound screw consisting of concentric threaded screws is housed by bearing housing 36 and is held in place by an internally threaded ring or screw ring 37. Internally threaded ring 37 has formed integrally therewith an outwardly and perpendicularly extending annular ring gear 50, said ring gear being beveled as shown in the drawings and having gear teeth in mesh with pinions 40 and 43 respectively.

Arched arm 41, and arched arm 42 respectively are formed integrally with the casing 36 and extend downwardly on opposite sides of said casing and each are then bent inwardly and are integrally connected to the ring-like annular portion 39 of casing 36. Ring gear 37 is rotatable only and has no movement longitudinally of the casing 36. Journalling bushings 51 and 52 are respectively mounted in arms 41 and 42 and shafts 44 and 44a respectively are rotatably journalled therein. Beveled pinion 40 is secured on the end of shaft 44 and in mesh with ring gear 50 and likewise pinion 43 is secured on shaft 44a and in mesh with ring gear 50 as shown.

The shaft 44 (a fragment only of which is shown in Fig. 1) extends to and is journalled at a point adjacent the drive shaft which extends rearwardly from the vehicle clutch whereat it has a suitable pinion (not shown) which gearingly connects it to the conventional vehicle drive shaft and to be driven thereby. A suitable throw-out and throw-in clutch accessible to the driver is provided (not shown) to provide for selective use of my device.

Screws 24, 25 and 26 can rotate as well as move in the direction of their lengths; screw 27 cannot rotate, with the exception as hereinafter provided for, but is allowed to have movements along its length. 38 is a ball bearing. 48 and 49 are screws for fastening the end plate of housing 36. 40 and 43 are pinions with bearings 51 and 52. 44 is a shaft and 45 is a universal joint. 46 and 47 are means for securing the device to the vehicle. The means 47 is not a part of 39—it is attached to and dropping down from housing 36, the main housing and bearing for the compound screw.

Casing 53 shown in Figs. 1 and 3 is made of three parts 53a, 53b and 53c, as shown in Fig. 1, and is suspended on flange 68 of screw 27 by means of springs 56 and 57 and bars 58 and 59; 54 is a cut-off end of screw 27 and has a diametrically extending right-angled shoulder formed on its upper end, as shown in Fig. 1, providing end surfaces in separate planes. The lower end of screw 27 is formed with a right-angled shoulder and end surfaces in two planes which, in one position of the screw 27, will fit snugly against screw end 54 so that the shoulders engage and whereby rotative movement of the screw 27 will be imparted to screw end 54. Screw end 54 is prevented from rotating by key 55 which has one end mounted in horizontal partition wall 53a of casing 53, said key being formed integrally with flange 69, except as hereinafter provided for; 60 and 61 are control bars secured to bar 59, 65 and 66 are ball bearings of conventional ring type, ball bearing 65 being about screw end 54 and below flange 69b. Screw end 54 and flange 69b are preferably formed in one integral piece. Bar 59 is mounted about the lower end of screw end 54; 62 and 63 are set screws; 67 and 69a are shafts which prevent case 53 from rotating. 44, 70, 71 and 72 are driving shafts.

The operation of my device is as follows: Two or more of my power jacks as heretofore described are securely mounted in spaced apart relation to each other, to each side truss of a standard vehicle frame, namely four units for each vehicle, and ony one thereof being actually driven from shaft 44 gearingly connected to the drive shaft of the vehicle engine, and auxiliary transmission shafts like and similarly mounted to shaft 44a transmit the rotative force from one to the other of said jacks so that all will operate in unison. The jack is in non-operating non-extended position as shown in Fig. 3. When shaft 44 is rotated clockwise, the ring gear 37 will rotate counterclockwise, looking from above, whereupon the internal threads of screw ring 37 will cause the three cylindrical screws 24, 25 and 26 and central screw 27 to move downwardly simultaneously.

Shortly after the beginning of this movement the right-angled shoulder of the downward face of central screw 27 engages the opposed shoulder in screw end 54. Springs 57 and 56 normally hold member 54 in locked position. As stated, key-like member 55 seats into recess 75 formed in 53a as soon as members 60 and 61 separate from surface 47. This is true because springs 56 and 57 pull bar 59 toward bar 58. This occurs upon the initial downward movement of housing 53. Angular members 60 and 61 only function to throw out the screw end 54 from engagement to separate the right-angled shouldered faces which are opposed to each other.

The foregoing downward movement of the cylindrical screws and central screw continues until the internal threads of screw ring 37 strikes and engages stud 28 on cylindrical screw 24, whereupon cylindrical screw 24 will begin rotating along with screw ring 37 and the lower internal threads of screw 24 will slidably and threadingly engage the interfitting threads of cylindrical screw 25, thereby causing said screws 25 and 26 and central screw 27 to be projected downwardly with respect to screw 24 which has been previously projected to its limit. The last mentioned projecting movement continues until the lower internal threads of screw 25 strike stud 30 on upper end of screw 26, whereupon both screws 24 and 25 and 26 will rotate together, the internal threads of screw 26 engaging the threads of screw 27 to cause central screw 27 to be moved downwardly with respect to screws 24, 25 and 26.

It will be apparent that at various points in any one of the successive or simultaneous longitudinal movements which have just been described, the bottom 53c of housing 53 may contact and rest upon the ground, road, floor or other supporting surface, (depending upon the distance thereof from the starting position of the jack). When such contact and support is made, the respective movements will cause the upper parts of the jack, including the housing 36, to be elevated, simultaneously raising the vehicle, to the frame of which one or more of said jacks are attached.

It is to be remembered that the rotative movements of the cylindrical screws 25 and 26 need not be successive, but due to possible difference in friction, either one thereof may be projected or moved longitudinally to its limit before the other. As herein explained, when the initial downward projecting movement of the jack screw 27 has taken place the casing 53 is, of course, well below the lower ends of the respective cylindrical screws 24, 25 and 26 and when said casing 53 rests upon the supporting surface, said casing is moved upwardly with respect to said jack screw, which action disengages the key-like member 55 from the recess in the central intermediate wall 53a, and the lower face of the screw end 54 rides with considerable friction on the ball bearing 64 because the weight of the vehicle is transmitted thereto. This friction is more than sufficient to prevent free rotation of the central jackscrew and said screw end, and the rotating force which is transmitted from shafts 44 and 44a will continue to project the central jack screw and said screw end further to the desired point. Central jack screw 27 is only rotated when the extreme limits of all the cylindrical screws 24, 25 and 26 and the extreme limit of the jack screw 27 has been reached, at which point the continued rotative force will rotate all of said screws with respect to the casing 53 and bearing 64.

67 represents a connecting rod from one lower housing 53 to the next similar housing of the adjacent jack, each of the housings upon a vehicle being connected to the next adjacent lower housing in this manner. This is shown schematically by the lower of the two adjacent longitudinal rods in Fig. 2.

In the movement to lower the vehicle the shaft 44 is rotated counter-clockwise, whereupon the internal threads of screw ring 37 slidably engage internal threads of screw 24 which—successively moves longitudinally—the screws 24, 25, 26 and 27 until the lower housing 53 is off the supporting surface.

As this reverse rotation continues, the screws 25, 26 and 27 are thereby moved longitudinally upward and the studs 33, 32 and 34 will respectively engage the external threads of cylindrical screws 24, 25 and 26 respectively until all the said cylindrical screws have been moved to their upward limit. At the time the last cylindrical screw reaches its upward limit the angular members 60 and 61 strike the lower edge 36a of housing 36 to stretch springs 57 and 56 to cause separation of the shoulder faces of screw 27 and screw end 54. At this time the device is ready again for normal elevating action.

It is to be noted that when all the co-operating screws 24, 25 and 26 are in their innermost position in the casing and housing 53 is drawn as close as permissible to housing 36, the angular control bars 60 and 61 will be depressed into casing 53 to stretch springs 56 and 57 to separate right-angled opposed faces of screw end 54 and screw 27, in which position screw 27 will be allowed to rotate due to the disengagement of said right-angled shoulder although with some friction. The object of these particular features is an important and necessary one as obviously, the operator would not know the exact instant at which all the co-operating screws reach their innermost position, and with the mechanism described aforesaid, the power driven rotation of shaft 44 and ring 50 may continue at which time all of said screws have reached their highest position as at that time screw 27 will be free and will rotate therewith without causing any further longitudinal movement of said screws.

The described system of screws, including the lower housing 53 and attached parts is in suspension when the jack is in its uppermost position and always before the jack is begun to be lowered. All the weight of these parts are upon the threads of screw ring 37 alone. The weight of the housing 53 and its contained parts including the attached rods 67 also produces a certain amount of friction between cross bar 58 (upon which most of said weight of said lower parts is suspended), at the point of bearing 66. Furthermore, housing 53 is not rotatable and the cross bar 58 cannot rotate at this uppermost position in which members 60, 61 have stretched the springs 56 and 57. There is a material spring-exerted pressure or thrust of bar 58 against bearing 66 which in turn is transmitted to flange 68 which is integral with screw 27. This produces friction and a pronounced spring-exerted downward pull on screw 27 which said friction and pull overcomes any tendency toward a rotation of screw 27 because of friction across lubricated threads from screw ring 37. The effect is the same on screw 27 as tying two stretched springs to its lower end—in fact stretched springs 56 and 57 pull on it to such an extent as to prevent its rotation prior to the time its lower end locks with screw end 54. All of said suspended weight including that of the screw and the friction produced by said total weight at the point of bearing 66 overcomes the friction between screw ring 37 and screw 24 and wholly avoids rotation of screws 24, 25, 26 and 27 prior to the time screw 27 and screw end 54 are interlocked as before described, and at the time of rotation to begin downward movement of screw 27.

Set screws 62 and 63 threadingly engage screw end 54 on diametrically opposite sides thereof and serve as stops to maintain cross bar 59 in place.

As stated, the screw 27 has a diametrical right-angled shoulder at its lower end to present a two-plane face opposed to and corresponding to right-angled two plane face of screw end 54. As indicated in Fig. 1, screw 27 has annular integral flange 68 and screw end 54 has a correspondingly shaped integral annular flange 69 substantially mid-way between its ends. The centrally apertured cross bar 58 normally rests on ball bearing 66 which separates it from flange 68. Centrally apertured cross bar 59 normally presses against bearing 65 which bearing in turn normally presses against flange 69. As clearly shown in Fig. 1, springs 56 and 57 connect said cross bars 58 and 59 and as said springs are mounted in a semi-stretched condition in assembly, said springs hold screw end 54 against end of screw 27 whereat the corresponding right-angled surfaces interlock against rotation with respect to each other and to prevent screw 27 from rotating as long as screw end 54 is locked against rotation by means of key 55. It is to be noted that central wall 53a of casing 53 has a suitable aperture 75 in which key 55 seats whenever the upper end of control bars 60 and 61 disengage the lower peripheral edge of housing 36 to permit contraction of springs 56 and 57. As stated, stretching action of said springs by descent of control bars 60 and 61 separates screw end 54 and screw 27 to disengage the right-angled respective shoulders thereof where the two meet. When screw ring 37 is rotated as before described it causes screw 27 to move either upwardly or downwardly. As casing 53 and attached parts are suspended entirely on the lower end of screw 27, obviously said casing 53 will descend with downward movement of screw 27. Further descent of screw 27 will cause screw end 54 to descend to ride on ball bearings 64, in which position key 55 is disengaged from its seat 75 and in position screw end 54 will be permitted to rotate, riding on bearing 64, along with screw 27 when and after the screws 24, 25 and 26 have reached their limit of projecting movement and stop abutment 31 has been engaged by the lowermost inwardly extending thread of screw 26. As indicated in Fig. 2, reference numeral 71 designates the horizontally extending member which comprises a portion of the means whereby the rotating force is transmitted from one to the other of the respective jacks when four thereof are mounted on a vehicle frame.

What I claim and desire to secure by Letters Patent, is:

1. In a power driven lifting jack adapted to operate from a vehicle engine, a screw housing; a jack screw longitudinally movable therein projecting exteriorly of said housing; a plurality of adjacent co-acting interengaging extensible rotatable screws in said housing, one of said extensible screws meshing with said jack screw; a metal casing below said screw housing and yieldably attached to said projecting jack screw end; means for mounting said screw housing on a vehicle frame; a spiral screw plug rotatably mounted on said housing and in mesh with the outermost of said plurality of screws; power driven transmission means in mesh with and connected to said plug for rotating the same; a screw end mounted for limited vertical movement within said lower metal casing, said screw end being in alignment with said central jack screw and having an upper shouldered surface adapted to engage said jack screw to cause said screw end to be rotated with said jack screw; springs mounted in said lower casing normally exerting a tendency to draw said screw end and said jack screw into interlocking engagement; said interengaged extensible screws being adapted to move longitudinally and to move said jack screw longitudinally.

2. In a jack for motor vehicles adapted to be attached to the vehicle body, a plurality of cylindrical longitudinally movable threaded screws in mesh with each other; a longitudinally movable central jack screw in threading engagement with one of said rotatable screws; a metal housing in which said screws are mounted for longitudinal movement, said housing being open at its lower end and said jack screw projecting through said open end of said housing; a hollow casing having a cylindrical wall having an open end, one end of said jack screw extending into said casing; a connecting cross bar within said hollow casing secured on the lower end of said jack screw; a cross bar extending diametrically of said casing and slidably mounted therein said casing being suspended by means of said cross bars with respect to said jack screw; a plurality of springs connecting said cross bars; a spiral plug rotatably mounted in said housing and threadingly engaging one of said screws, the rotation of said plug being adapted to successively move said screws longitudinally and to successively rotate the same to move said central jack screw longitudinally to normally elevate said housing and attached parts; and means driven from a vehicle engine and mounted adjacent to and engaging said screw plug for rotating the same.

3. In a power driven lifting jack adapted to operate from a vehicle engine, a screw housing; a jack screw longitudinally movable therein projecting exteriorly of said housing; a plurality of adjacent coacting interengaging extensible rotatable screws in said housing, one of said extensible screws meshing with said jack screw; a metal casing below said screw housing and attached to said projecting jack screw end; said casing being movable vertically with respect to said jack screws; a screw end rotatably journalled in said casing in longitudinal alignment with said jack screw and having one of its ends adjacent the lower end of said jack screw, said adjacent ends of said screw end and jack screw having interlocking shoulders; means in said casing for releasably locking said screw end against rotation when said casing is in descended position and spaced apart from said housing; means for mounting said screw housing on a vehicle frame; a spiral screw plug rotatably mounted in said casing and in mesh with the outermost of said plurality of screws; power driven transmission means in mesh with and connected to said plug for rotating the same, the rotation of said plug being adapted to move said extensible screws longitudinally and to move said jack screw longitudinally.

4. In a jack for motor vehicles adapted to be attached to the vehicle body, a plurality of rotatably longitudinally movable threaded screws in mesh with each other; a longitudinally movable central jack screw in threading engagement with one of said rotatable screws; a metal housing in which said screws are mounted for longitudinal movement, said housing being open at its lower end and said jack screw projecting through said open end of said housing; a hollow casing having an open end, one end of said jack screw extending into said casing; a connecting cross bar secured on the lower end of said jack screw; a cross bar extending diametrically of said casing and slidably mounted therein; a plurality of springs connecting said cross bars; a threaded screw plug rotatably mounted in said housing and threadingly engaging one of said screws; a pinion rotatably mounted adjacent said screw plug and threadingly engaging said screw plug; a rotatable shaft on which said pinion is mounted and connected to power driven means, the rotation of said pinion being adapted to successively move said screws and jack screw longitudinally in a common downward direction to thereby elevate said housing and parts supported thereby, said casing being adapted to contact the ground or the like.

5. A jacking device adapted to be mounted on a vehicle, comprising a metal housing adapted to be attached in vertical position to a vehicle; a central jack screw movable longitudinally therein and having one end projecting below the housing; a plurality of rotatable threaded adjacent interfitting and longitudinally movable screws the innermost of which threadingly engages said jack screw; stop studs on the upper ends of said screws, the rotation of the outermost of said screws being adapted to successively rotate and project said adjacent screws to effect upward movement of said housing and parts supported thereby; an internally threaded screw plug rotatably mounted in the wall of said casing and threadingly engaging the outermost of said screws, a lower casing in alignment with said housing and suspended on the lower end of said jack screw, said casing being adapted to engage the ground or other supporting surface; and means connecting the lower end of said jack screw and said casing whereby said screw will be prevented from rotation.

6. A jacking device adapted to be mounted to a vehicle body whereby the same will contact the ground and elevate said body, comprising a metal housing adapted to be attached to a vehicle body in substantially vertical position, a central jack screw mounted for longitudinal movement therein and having its lower end projecting below said housing; a compound screw comprising a plurality of adjacent interfitting threaded screws in said housing, the innermost of said plurality of screws threadingly engaging said jack screw; a threaded ring rotatably mounted in the side wall of said housing and having inner spiral threads engaging the outermost of said screws, the rotation of said threaded ring being adapted to move said screws longitudinally and downwardly and successively in the order of their relative positions; a stopping element on the end of each of said screws whereby the rotation of each screw is limited and transmitted to rotate the next adjacent screw; an annular beveled gear formed integral with said threaded ring, rotatably mounted gear means in mesh with said integral beveled gear and adapted to rotate said threaded ring; a metal casing having its upper end open and adjacent the open and lower end of said housing; a cross bar in said casing and yieldably and slidably mounted therein; a second cross bar in said casing spaced apart from said first mentioned cross bar and adapted to be engaged by the projecting end of said jack screw; yieldable springs connecting said cross bars respectively, the downward movement of said jack screw being adapted to lower said casing and enclosed parts and to separate the same from said housing and enclosed parts to thereby elevate parts to which said housing is secured.

7. A jacking device adapted to be mounted to a vehicle body whereby the same will contact the ground and elevate said body, comprising a metal housing adapted to be attached to a vehicle body in substantially vertical position, a central jack screw mounted for longitudinal movement therein and having its lower end projecting below said housing spaced apart cross bars adjacent the lower end of said jack screw; a compound screw comprising a plurality of adjacent interfitting threaded screws in said housing, the innermost of said plurality of screws threadingly engaging said jack screw; a threaded ring rotatably mounted in the side wall of said housing and having inner threads engaging the outermost of said screws, the rotation of said threaded ring being adapted to move said screws longitudinally and downwardly and successively in the order of their relative positions; a stopping element on the end of each of said screws whereby the rotation of each screw is limited and transmitted to rotate the next adjacent screw, a hollow casing below said housing, the lower end of said jack screw projecting thereinto; a longitudinally movable screw end in said casing and in alignment with said jack screw adapted to interlock rotatably with said jack screw to lock said jack screw against rotation in its lowermost position, said casing being yieldably mounted and suspended through said cross bars on said jack screw, an annular beveled gear on said threaded ring; and rotatably mounted gear means in mesh with said beveled gear and adapted to rotate said gear.

WALTER H. TRINKLER.